(12) United States Patent
Van Doninck et al.

(10) Patent No.: US 7,403,546 B2
(45) Date of Patent: Jul. 22, 2008

(54) RECEIVER, SENDER, METHOD AND BURST SIGNAL

(75) Inventors: Alain Johan Maria Van Doninck, Ranst (BE); Alfons Corneel Emiel Adriaensen, Antwerpen (BE); Wolfgang Steinert, Backnang (DE)

(73) Assignee: Alcatel, Paris (FR)

( * ) Notice: Subject to any disclaimer, the term of this patent is extended or adjusted under 35 U.S.C. 154(b) by 1156 days.

(21) Appl. No.: 10/212,767

(22) Filed: Aug. 7, 2002

(65) Prior Publication Data

US 2003/0048809 A1 Mar. 13, 2003

(30) Foreign Application Priority Data

Aug. 9, 2001 (EP) .................................. 01402151

(51) Int. Cl.
*H04J 3/06* (2006.01)
(52) U.S. Cl. ..................................... 370/503; 375/354
(58) Field of Classification Search .................. 370/503
See application file for complete search history.

(56) References Cited

U.S. PATENT DOCUMENTS

| | | | | |
|---|---|---|---|---|
| 4,464,765 A | * | 8/1984 | Shimizu | 375/292 |
| 5,245,611 A | * | 9/1993 | Ling et al. | 370/347 |
| 5,781,540 A | | 7/1998 | Malcolm et al. | |
| 5,953,649 A | * | 9/1999 | Junell | 455/67.11 |
| 6,240,083 B1 | | 5/2001 | Wright et al. | |
| 6,728,326 B1 | * | 4/2004 | Fulghum | 375/365 |

OTHER PUBLICATIONS

Lee L-N et al.: "Digital Signal Processor-Based Programmable BPSK/QPSK/OFFSET-QPSK Modems", Comsat Technical Review, Communications Satellite Corporation, Washington, US, vol. 19, No. 2, Sep. 21, 1989, pp. 195-234.

* cited by examiner

*Primary Examiner*—Frank Duong
*Assistant Examiner*—Toan Nguyen
(74) *Attorney, Agent, or Firm*—Sughrue Mion, PLLC

(57) ABSTRACT

Known burst signals exchanged between senders and receivers comprise either one syncronisation block followed by a data block or several equidistant synchronisation blocks separated by data blocks, with a synchronisation block including predefined synchronisation symbols and with a data block including data symbols. By adapting senders and receivers in such a way that said synchronisation blocks are located non-equidistantly, preferably with a centre of gravity of synchronisation symbols mainly corresponding with a centre of the burst signal, an improved synchronisation can be reached. Thereto, senders and receivers comprise locators for locating the non-equidistant synchronisation blocks, with the receivers preferably further comprising determinators for determining phases of synchronisation blocks, and synchronisers for synchronising detectors/demodulators in dependence of neighbouring as well as non-neighbouring non-equidistant synchronisation blocks, and processor systems for calculating frequencies in dependence of locations and/or phases. The processor systems preferably comprise estimators for estimating main frequencies.

7 Claims, 2 Drawing Sheets

RECEIVER, SENDER, METHOD AND BURST SIGNAL

BACKGROUND OF THE INVENTION

The invention relates to a receiver for receiving a burst signal comprising synchronisation blocks including predefined synchronisation symbols and comprising data blocks including data symbols.

Such a receiver is generally known and comprises an identifier for identifying said predefined synchronisation symbols and comprises a synchroniser coupled to said identifier for, in dependence of said identifying, estimating at least one frequency and/or at least one phase and/or at least one timing of the burst signal, and for synchronising a detector (like for example a demodulator) for detecting (like for example demodulating) said data symbols.

Known burst signals either comprise one synchronisation block or several equidistant synchronisation blocks.

In case of comprising one synchronisation block, the receiver has only this single block for synchronising purposes. In this case, a relatively small synchronisation block (compared to the size of the data block) results in a high information efficiency, but a low synchronisation accuracy, and a relatively large synchronisation block (compared to the size of the data block) results in a high synchronisation accuracy, but a low information efficiency.

In case of comprising several equidistant synchronisation blocks, the receiver has several blocks for synchronising purposes. Then, just small deviations in frequency can be synchronised, due to the large distance between some of the blocks which leads to ambiguities as the phase differences of widely separated blocks will exceed plus or minus 180 degrees, while the fixed distance between the synchronisation blocks does not provide the necessary information to resolve said ambiguities.

The known receiver is disadvantageous, inter alia, due to not being able to synchronise larger deviations in frequency and/or timing in combination with high information efficiencies and/or high synchronisation accuracies.

SUMMARY OF THE EXEMPLARY EMBODIMENTS OF THE INVENTION

It is an object of the invention, inter alia, of providing a receiver as defined in the preamble which allows larger deviations in frequency and/or timing to be synchronised in combination with high information efficiencies and/or high synchronisation accuracies.

The receiver according to the invention is characterised in that said burst signal comprises at least three synchronisation blocks at non-equidistant locations, with said receiver comprising a locator for locating said non-equidistant synchronisation blocks.

By defining the burst signal comprising at least three synchronisation blocks at non-equidistant locations, with a distance between two blocks being defined as for example a distance between a first symbol of the first block and a first symbol of the second block, or as for example a distance between a centre of the first block and a centre of the second block, and by providing the receiver with said locator for locating (=localising) said non-equidistant synchronisation blocks (determining locations of said non-equidistant synchronisation blocks, with said locations corresponding for example with said first symbols or with said centres), much larger deviations in frequency and/or timing can be synchronised in combination with high information efficiencies (relatively small synchronisation blocks compared to large data blocks) and/or high synchronisation accuracies.

The invention is based on the insight, inter alia, that a number of non-equidistant synchronisation blocks comprises more information than the same number of the same synchronisation blocks but now lying at equidistant locations, due to extra information being present in the different distances.

The invention solves the problem, inter alia, of providing a receiver which allows larger deviations in frequency and/or timing to be synchronised in combination with high information efficiencies and/or high synchronisation accuracies.

A first embodiment of the receiver according to the invention is characterised in that said receiver comprises a determinator coupled to said locator for determining phases of synchronisation blocks.

By providing the receiver with said determinator, a first phase of a first synchronisation block and a second phase of a second synchronisation block and a third phase of a third synchronisation block etc. are determined, the difference between these first and second phases is divided by a first distance (expressed in time) between said first and second synchronisation block, resulting in a first estimation of the frequency (and phase) of said burst signal, which then is used for phase correction when dividing the difference between these second and third phases by a second distance (expressed in time) between said second and third synchronisation block, resulting in a second (more accurate) estimation of the frequency (and phase) of said burst signal etc.

Of course, for said symbols, all different kinds of modulation methods can be used, like for example BPSK, QPSK, QAM, TRELLIS or further known modulation methods. The phase of each synchronisation block corresponds with the angle of the sumvector resulting from summing the vectors of each synchronisation symbol of said synchronisation block, after the modulation has been removed, using the known information.

A second embodiment of the receiver according to the invention is characterised in that said receiver comprises a synchroniser coupled to said locator and to said determinator for synchronising a detector/demodulator in dependence of neighbouring as well as non-neighbouring non-equidistant synchronisation blocks.

By providing the receiver with said synchroniser for synchronising a detector/demodulator in dependence of neighbouring as well as non-neighbouring (for example each possible pair of) non-equidistant synchronisation blocks, now, in addition to said first and second (more accurate) estimation, a third estimation can be made, by dividing the difference between the first and third phases by a third distance (expressed in time) between said first and third synchronisation block, resulting in said third estimation of the frequency (and phase) of said burst signal, etc.

By not just using pairs of subsequent (neighbouring) synchronisation blocks but by using for example all pairs of each possible two synchronisation blocks (subsequent or neighbouring synchronisation blocks as well as non-subsequent or non-neighbouring synchronisation blocks), the insight of the invention, inter alia, that a number of non-equidistant synchronisation blocks comprises more information than the same number of the same synchronisation blocks but now lying at equidistant locations, due to extra information being present in the different distances, is used at most.

A third embodiment of the receiver according to the invention is characterised in that said receiver comprises a processor system for calculating frequencies in dependence of locations and/or phases.

Said processor system comprises for example said identifier (or an identifying function, thereby becoming said identifier), and/or said synchroniser (or a synchronising function, thereby becoming said synchroniser), and/or said detector/demodulator (or a detecting/demodulating function, thereby becoming said detector/demodulator), and/or said locator (or a locating function, thereby becoming said locator), and/or said determinator (or a determining function, thereby becoming said determinator), and/or a comparator (or a comparing function, thereby becoming said comparator) for comparing symbols for identifying purposes, and/or a calculator (or a calculating function, thereby becoming said calculator) for adding, subtracting, multiplying and/or dividing purposes etc.

A fourth embodiment of the receiver according to the invention is characterised in that said processor system comprises an estimator for estimating a main frequency in dependence of calculated frequencies, locations and/or phases.

Said processor system comprises for example said estimator (or an estimating function, thereby becoming said estimator) for performing linear regression, for example.

The invention further relates to a sender for sending a burst signal comprising synchronisation blocks including predefined synchronisation symbols and comprising data blocks including data symbols.

The sender according to the invention is characterised in that said burst signal comprises at least three synchronisation blocks at non-equidistant locations, with said sender comprising a generator for generating said non-equidistant synchronisation blocks.

A first embodiment of the sender according to the invention is characterised in that a first sum of first products resulting from synchronisation symbols situated left from a centre of said burst signal and multiplied with their distance to said centre mainly equals a second sum of second products resulting from synchronisation symbols situated right from said centre and multiplied with their distance to said centre.

By adapting said generator in such a way that said synchronisation blocks are being located non-equidistantly, now with a 'gravity' centre of all synchronisation symbols mainly corresponding with a burst signal centre, an improved synchronisation can be reached, due to errors (made left and right of said mainly corresponding centres) being compensated, resulting in a higher synchronisation accuracy. The centre of gravity is for example defined in the literature with the weight of each symbol being represented by its energy in the signal.

It should be noted that each (embodiment of said) receiver according to the invention and/or each (embodiment of said) sender according to the invention may correspond partly or entirely with a processor (system), and/or with a network-unit (like for example a switch, a base station, a node, a bridge, a router, a gateway etc.), a terminal, a residential-unit (like for example a base station, a gateway etc.), or a server etc. usually but not exclusively for wireless, cordless and/or mobile communication.

The invention yet further relates to a method for receiving and/or sending a burst signal comprising synchronisation blocks including predefined synchronisation symbols and comprising data blocks including data symbols.

The method according to the invention is characterised in that said burst signal comprises at least three synchronization blocks at non-equidistant locations, with said method comprising a step of locating said non-equidistant synchronisation blocks.

Embodiments of the method according to the invention correspond with embodiments of said receiver according to the invention and/or with embodiments of said sender according to the invention.

The invention also relates to a burst signal comprising synchronisation blocks including predefined synchronisation symbols and comprising data blocks including data symbols.

The burst signal according to the invention is characterised in that said burst signal comprises at least three synchronisation blocks at non-equidistant locations.

A first embodiment of the burst signal according to the invention is characterised in that a first sum of first products resulting from synchronisation symbols situated left from a centre of said burst signal and multiplied with their distance to said centre mainly equals a second sum of second products resulting from synchronisation symbols situated right from said centre and multiplied with their distance to said centre.

By locating said synchronisation blocks non-equidistantly, now with a 'gravity' centre of all synchronisation symbols mainly corresponding with a burst signal centre, an improved synchronisation can be reached, due to errors (made left and right of said mainly corresponding centres) being compensated, resulting in a higher synchronisation accuracy. The centre of gravity is for example defined in the literature with the weight of each symbol being represented by its energy in the signal.

BRIEF DESCRIPTION OF THE DRAWINGS

The invention will be further explained more detailledly at the hand of an example shown in the drawings, whereby FIG. 1 discloses two prior art burst signals and a burst signal according to the invention, and FIG. 2 discloses a sender according to the invention and a receiver according to the invention.

DETAILED DESCRIPTION OF EXEMPLARY EMBODIMENTS OF THE INVENTION

Figure 1:
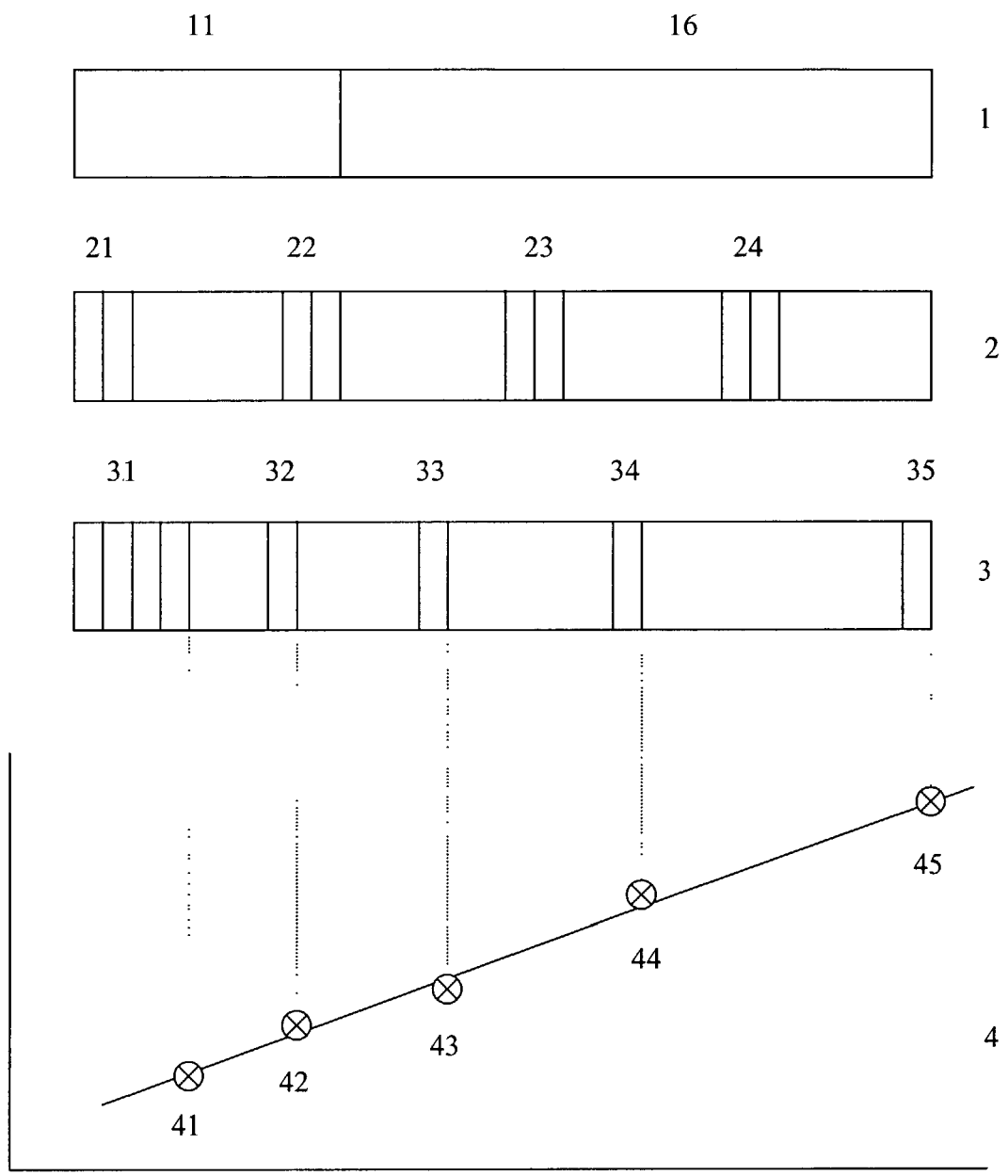

FIG. 1 discloses a first prior art burst signal 1 comprising a synchronisation block 11 for example including eight (or for example sixteen or eighty) synchronisation symbols and comprising a data block 16 for example including twenty (or for example forty or two hundred) data symbols. A second prior art burst signal 2 comprises four equidistant syncronisation blocks 21-24 each for example including two (or for example four of twenty) synchronisation symbols, with data blocks situated between each pair of synchronisation blocks. A third burst signal 3 according to the invention comprises five non-equidistant synchronisation blocks 31-35, with the first synchronisation block 31 for example including four (or for example eight or forty) synchronisation symbols and with the other synchronisation blocks 32-35 each for example including one (or for example two or ten) synchronisation symbol, and with data blocks situated between each pair of synchronisation blocks. A function 4 discloses a phase axis vertically and a time axis horizontally, with a slope of said function corresponding with a frequency, and with points 41-45 corresponding with synchronisation blocks 31-35 respectively.

Figure 2:
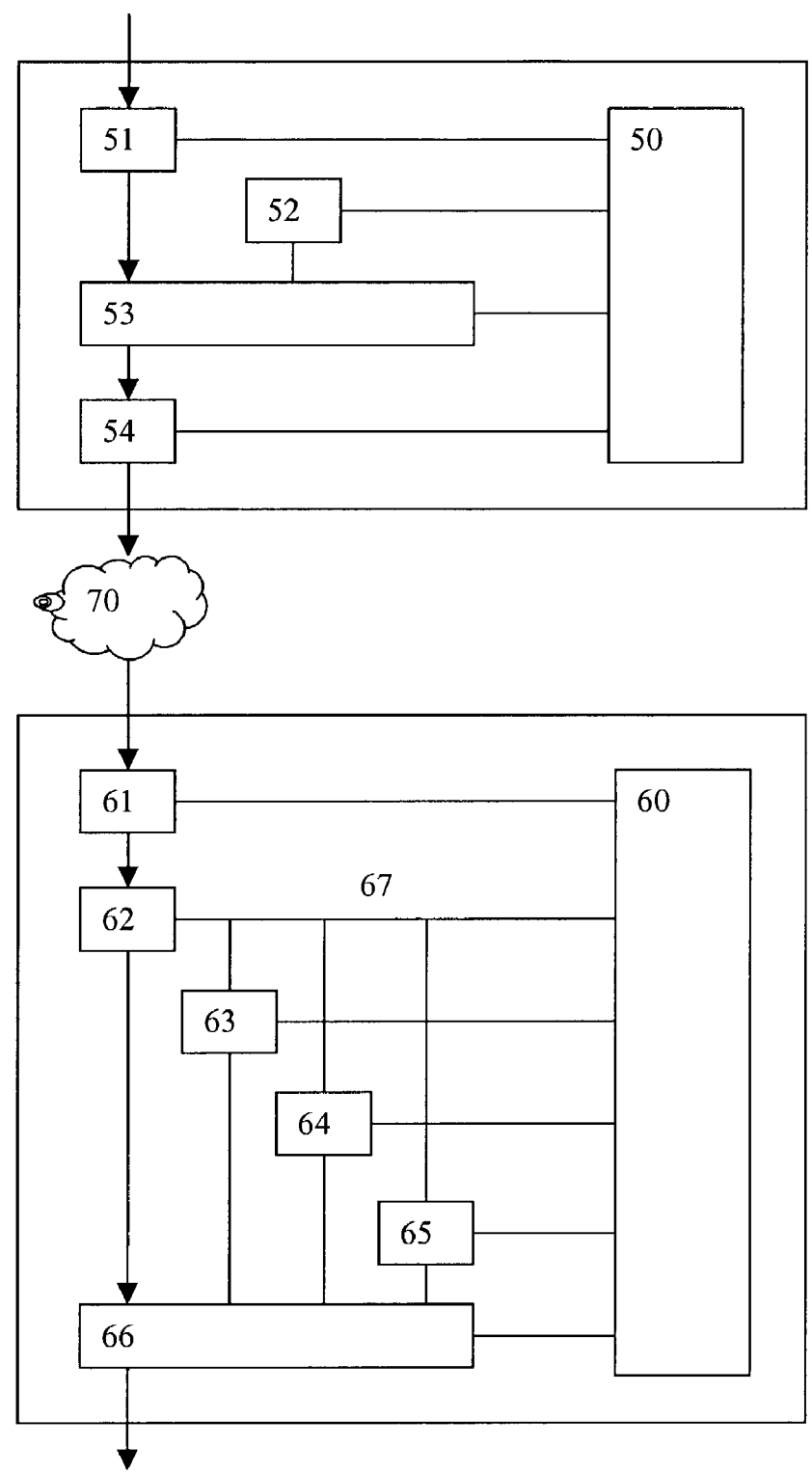

FIG. 2 discloses a sender comprising a processor (system) 50 coupled via a control connection to a data supplier 51 having an input for receiving data to be transmitted via a burst signal and having an output for supplying said data in the form of data blocks coupled via a data connection to a first input of a combiner 53. Processor 50 is further coupled via a control connection to a generator 52 for generating non-equidistant synchronisation blocks, which generator is coupled to a second input of combiner 53 for combining said data blocks and said non-equidistant synchronisation blocks. Processor 50 is also coupled via control connections to combiner 53 and to a modulator/converter 54, of which an input is coupled via a data connection to said output of combiner 53 and of which an output is coupled to a network 70 being a wired and/or wireless and/or cordless and or mobile (and public and/or private) network.

A receiver in FIG. 2 comprises a processor (system) 60 coupled via a control connection to a demodulator/deconverter/filter 61 of which an input is coupled to said network 70 and of which an output is coupled via a data connection to an input of an identifier 62. An output of identifier 62 is coupled via a data connection to a first input of a detector/demodulator 66, of which a second input is coupled via a control connection to a locator 63 and of which a third input is couled via a control connection to a synchroniser 64 and of which a fourth input is coupled via a control connection to a determinator 65. Locator 63, synchroniser 64 and determinator 65 are each coupled to processor 60 via via a control connection, and are all coupled to a control bus 67, which is further coupled to processor 60 and identifier 62. An output of detector/demodulator 66 generates said data inputted at data supplier 51.

The sender according to the invention and the receiver according to the invention as shown in FIG. 2 function as follows. Generator 52 receives non-equidistant synchronisation blocks 31-35 comprising predefined synchronisation symbols from for example processor 50 or a memory not shown, and supplies these blocks 31-35 to combiner 53 (like for example a shift register +memory), under control of processor 50. Data supplier 51 (like for example a buffer) receives data to be transmitted from for example a man-machine-interface (like for example a microphone or a camera) not shown or a database not shown or processor 50, and supplies said data in the form of datablocks to combiner 53, under control of processor 50 and such that these data blocks fit between said synchronisation blocks. Combiner 53, under control of processor 50, combines said blocks into burst signal 3, which burst signal 3 is transmitted via modulator/converter 54 (for modulation purposes and/or D/A conversion etc.) to network 70, at a burst signal frequency generated in said sender.

Due to this burst signal frequency never being 100% equal to a synchronisation frequency generated in said receiver, and/or due to jitter, the receiver must be synchronised, which cannot be done via a Phase Locked Loop (PLL) due to said burst signal having a too short duration (like for example a TDMA or CDMA signal).

Burst signal 3 arrives at demodulator/deconverter/filter 61, which informs processor 60 and which supplies said burst signal after demodulation and/or A/D conversion and/or filtering to identifier 62. Identifier 62 comprises for example a comparator for comparing blocks and/or symbols of said burst signal 3 with comparison information originating from for example processor 60 or a memory not shown, and identifies synchronisation blocks 31-35, and supplies these synchronisation blocks 31-35 or information related to these synchronisation blocks 31-35 to for example processor 60, locator 63, synchroniser 64 and determinator 65 via control bus 67. Locator 63 locates these synchronisation blocks 31-35 (in other words established their locations, like for example the first symbol of each block and/or the centre of each block), and informs processor 60 and/or synchroniser 64, after which synchroniser 64, either directly via said third input of detector/demodulator 66 or indirectly via for example processor 60 or locator 63 and said second input of detector/demodulator 66, synchronises detector/demodulator 66, which has received said (demodulated and/or deconverted and/or filtered) burst signal 3 from identifier 62 and which thanks to said synchronisation is able to detect/demodulate said data blocks for generating said data inputted at data supplier 51.

Preferably, in addition to the above, determinator 65 is used, for determining a first phase of said first synchronisation block 31 and a second phase of said second synchronisation block 32 and a third phase of said third synchronisation block 33 etc., and supplies this information to processor 60, which comprises a calculator for calculating a first difference between these first and second phases and for dividing this first difference by a first distance (expressed in time) between both synchronisation blocks 31 and 32, resulting in a first (rough) estimation of the frequency (and phase) of burst signal 3, which then is used for phase correction when dividing a second difference between these second and third phases by a second distance (expressed in time) between both synchronisation blocks 32 and 33, resulting in a second (more accurate) estimation of the frequency (and phase) of burst signal 3 etc. This is a several-step synchronisation.

Of course, for said symbols, all different kinds of modulation methods can be used, like for example BPSK, QPSK, QAM, TRELLIS or further known modulation methods. The phase of each synchronisation block corresponds with the angle of the sumvector resulting from summing the vectors of each synchronisation symbol of said synchronisation block, after the modulation has been removed, using the known information.

Further preferably, in addition to the above, synchroniser 64 is used for synchronising detector/demodulator 66 in dependence of neighbouring as well as non-neighbouring (best case: each pair of) non-equidistant synchronisation blocks. Then, in addition to said first and second (more accurate) estimation, a third estimation can be made, by dividing the difference between the first and third phases by a third distance (expressed in time) between said first and third synchronisation block, resulting in said third estimation of the frequency (and phase) of said burst signal, etc.

By not just using pairs of subsequent (neighbouring) synchronisation blocks but by using (most of) all pairs of each possible two synchronisation blocks (subsequent or neighbouring synchronisation blocks as well as non-subsequent or non-neighbouring synchronisation blocks), the insight of the invention, inter alia, that a number of non-equidistant synchronisation blocks comprises more information than the same number of the same synchronisation blocks but now lying at equidistant locations, due to extra information being present in the different distances, is used at most.

Usually, but not exclusively, for all possible pairs of each possible two synchronisation blocks (subsequent or neighbouring synchronisation blocks as well as non-subsequent or non-neighbouring synchronisation blocks), the distance within each pair is to be determined, after which all possible pairs are put in order (sequence) in dependence of said distances. Then the pair having the smallest distance is used for a first estimation, then the next pair having the one but smallest distance is used for a second estimation, etc. However, other orders (sequences) are not to be excluded.

Alternatively, and/or in addition, processor 60 may comprise an estimator not shown (or an estimating function, thereby becoming said estimator) for estimating a main frequency in dependence of calculated frequencies, locations and/or phases, for performing linear regression, for example. Then, points 41-45 as determined by determinator 65 are used by processor 60 for a one-step synchronisation (although linear regression may comprise several steps), contrary to the several-step synchronisation as performed by determinator 65.

Parts of the above can be further improved by adapting said sender such that a first sum of first products resulting from synchronisation symbols situated left from a centre of said burst signal and multiplied with their distance to said centre mainly equals (mainly corresponds with) a second sum of second products resulting from synchronisation symbols situated right from said centre and multiplied with their distance to said centre. By adapting said generator 52 (and/or combiner 53) in such a way that said synchronisation blocks are being located non-equidistantly, now with a 'gravity' centre of all synchronisation symbols mainly corresponding with a burst signal centre, an improved synchronisation can be reached, due to errors (made left and right of said mainly corresponding centres) being compensated, resulting in a higher synchronisation accuracy. The centre of gravity is for example defined in the literature with the weight of each symbol being represented by its energy in the signal.

Each part of said sender and receiver, shown in the form of a block or not shown, can be 100% hardware, 100% software or a mixture of both. Said sender and said receiver may each be a tranceiver for bidirectional use, in which case each transceiver will comprise (at least most of) all parts of said sender and said receiver, whereby said processors and/or processor systems can be combined (like for example integrated) or not. Said processors and/or processor systems each may comprise said identifier (or an identifying function, thereby becoming said identifier), and/or said synchroniser (or a synchronising function, thereby becoming said synchroniser), and/or said detector/demodulator (or a detecting/demodulating function, thereby becoming said detector/demodulator), and/or said locator (or a locating function, thereby becoming said locator), and/or said determinator (or a determining function, thereby becoming said determinator), and/or a comparator (or a comparing function, thereby becoming said comparator) for comparing symbols for identifying purposes, and/or a calculator (or a calculating function, thereby becoming said calculator) for adding, subtracting, multiplying and/or dividing purposes etc. And said processors and/or processor systems each comprising said estimator not shown (or an estimating function, thereby having become said estimator) may be separated from said estimator, which then will become a separate unit.

Each block shown or not shown can be integrated with each other block shown and/or not shown per sender and receiver. In addition to the memories already discussed, each block can have a further memory not shown for efficiency purposes. Each bus may be replaced by separate connections, thereby for example introducing multiplexers and demultiplexers. Buffers and/or switches may be introduced for parallel purposes, etc. A modulator/converter comprises a modulator and/or a converter, a detector/demodulator comprises a detector and/or a demodulator, and a demodulator/deconverter/filter comprises a demodulator and/or a deconverter and/or a filter.

The invention claimed is:

1. A receiver for receiving a burst signal comprising synchronisation blocks including predefined synchronisation symbols and comprising data blocks including data symbols, characterised in that said burst signal comprises at least three synchronisation blocks at non-equidistant locations, with said receiver comprising a locator for locating said non-equidistant synchronisation blocks, wherein a first sum of first products resulting from said synchronization symbols situated left from a center of said burst signal and multiplied with a corresponding distance of the right symbols to said center mainly equals a second sum of second products resulting from synchronisation symbols situated right from said center and multiplied with a corresponding distance of the right symbols to said center.

2. The receiver according to claim 1, characterised in that said receiver comprises a determinator coupled to said locator for determining phases of synchronisation blocks.

3. The receiver according to claim 2, characterised in that said receiver comprises a synchroniser coupled to said locator and to said determinator for synchronising a detector/demodulator in dependence of neighbouring as well as non-neighbouring non-equidistant synchronisation blocks.

4. The receiver according to claim 1, characterized in that said receiver comprises a processor system for calculating frequencies in dependence of locations and/or phases.

5. The receiver according to claim 4, characterised in that said processor system comprises an estimator for estimating a main frequency in dependence of calculated frequencies, locations and/or phases.

6. A transmitter for transmitting a burst signal comprising synchronisation blocks including predefined synchronisation symbols and comprising data blocks including data symbols, characterised in that said burst signal comprises at least three synchronisation blocks at non-equidistant locations, with said transmitter comprising a generator for generating said non-equidistant synchronisation blocks, wherein a first sum of first products resulting from said synchronization symbols situated left from a center of said burst signal and multiplied with a corresponding distance of the left symbols to said center mainly equals a second sum of second products resulting from synchronisation symbols situated right from said center and multiplied with a corresponding distance of the right symbols to said center.

7. A method for receiving and/or sending a burst signal comprising synchronisation blocks including predefined synchronisation symbols and comprising data blocks including data symbols, characterised in that said burst signal comprises at least three synchronisation blocks at non-equidistant locations, with said method comprising a step of locating said non-equidistant synchronisation blocks, wherein a first sum of first products resulting from said synchronization symbols situated left from a center of said burst signal and multiplied with a corresponding distance of the left symbols to said center mainly equals a second sum of second products resulting from synchronisation symbols situated right from said center and multiplied with corresponding distance of the right symbols to said center.

* * * * *